(12) United States Patent
Arriola Badiola et al.

(10) Patent No.: US 10,029,338 B2
(45) Date of Patent: Jul. 24, 2018

(54) MACHINE AND CELL FOR THE ASSEMBLY OF VALVE SEATS AND GUIDES

(75) Inventors: Aitzol Arriola Badiola, Elgoibar (ES); Luis Maria Zubiaurre Lodoso, Elgoibar (ES)

(73) Assignee: GAINDU, S.L., Elgoibar (Guipuzcoa) (ES)

( * ) Notice: Subject to any disclaimer, the term of this patent is extended or adjusted under 35 U.S.C. 154(b) by 730 days.

(21) Appl. No.: 14/421,518

(22) PCT Filed: Aug. 13, 2012

(86) PCT No.: PCT/ES2012/070625
§ 371 (c)(1),
(2), (4) Date: Jun. 23, 2015

(87) PCT Pub. No.: WO2014/027121
PCT Pub. Date: Feb. 20, 2014

(65) Prior Publication Data
US 2015/0306715 A1    Oct. 29, 2015

(51) Int. Cl.
*B25B 27/14* (2006.01)
*B23P 19/04* (2006.01)
*B23P 19/00* (2006.01)
*B23P 19/02* (2006.01)
*B23P 21/00* (2006.01)

(52) U.S. Cl.
CPC ........... *B23P 19/042* (2013.01); *B23P 19/001* (2013.01); *B23P 19/02* (2013.01); *B23P 21/00* (2013.01)

(58) Field of Classification Search
CPC ....... B23P 19/042; B23P 19/02; B23P 19/001; B23P 21/00
See application file for complete search history.

(56) References Cited

U.S. PATENT DOCUMENTS 3,798,736 A * 3/1974 Gibbons ............... B23P 21/006
   29/26 A
6,467,154 B1   10/2002 Beggs

FOREIGN PATENT DOCUMENTS

| DE | 42 12 178 | 10/1993 |
|---|---|---|
| GB | 2 450 677 | 1/2009 |
| JP | 62-102927 | 5/1987 |
| JP | 62-275597 | 11/1987 |

(Continued)

*Primary Examiner* — David Bryant
*Assistant Examiner* — Nirvana Deonauth

(57) ABSTRACT

The machine comprises:
a first station (4) for loading and unloading said cylinder head (9) and for loading said guides (13) and seats (12) in an upper mask (11) and a lower mask (10), respectively;
a second pressing station (5) for the assembly and pressing of said guides (13) and seats (12) in the cylinder head (9);
a rotating table (6) that comprises a first support tool (8) and a second support tool (8'), the first and second tools are configured to support a cylinder head (9) and the aforementioned table is configured to rotate so that the first tool (8) and the second tool (8') are arranged alternatively and simultaneously at the first station (4) and at the second station (5);
a first manipulator (7) configured to place said guides (13) and said seats (12) in the upper mask (11) and in the lower mask (10), respectively, at the first station (4);
at least one pressing head (21) configured to snap the seats (12) and guides (13) on to the cylinder head (9) at the second station (5).

15 Claims, 13 Drawing Sheets

(56) References Cited

FOREIGN PATENT DOCUMENTS

| | | |
|---|---|---|
| JP | 09-192947 | 7/1997 |
| JP | 2000-52161 | 2/2000 |
| JP | 2010-269403 | 12/2010 |

\* cited by examiner

MACHINE AND CELL FOR THE ASSEMBLY OF VALVE SEATS AND GUIDES

TECHNICAL FIELD

The present invention relates to the field of assembly machines for valve guides and seats in cylinder heads for engines.

BACKGROUND OF THE INVENTION

Currently, there are well known guide and seat assembly cells that assemble valve guides and seats in engine cylinder heads automatically.

These conventional assembly cells comprise a cylinder head infeed conveyor for the placement of the guides and seats, an oiling station, a guide and seat assembly and pressing station, a cylinder head outfeed conveyor with the guides and seats in place and a first manipulating robot in charge of placing said guides and seats automatically in the engine cylinder heads and a second manipulating robot in charge of the transfers between the infeed and outfeed conveyors, the assembly and pressing stations and the oiling station. Specifically, the second manipulating robot takes a cylinder head from the infeed conveyor and takes it to the oiling station. Once the oiling operation is completed, the robot takes the cylinder head to the guide and valve placing station, where the first robot feeds the guides and seats to the cylinder head. Once this operation is completed, the second robot takes the cylinder head and places it on the outfeed conveyor.

These cells can also comprise a seat feeder and a guide feeder, which are generally automatic.

Even though said assembly process is completely automated, this type of known assembly cells currently present a low efficiency because the entire assembly is carried out sequentially in one single station provided in the assembly cell.

Therefore, the need for an assembly cell that allows maximizing the productivity seems obvious.

DESCRIPTION OF THE INVENTION

The object of the invention is a machine for the assembly of valve guides and seats in a cylinder head comprising:
  a first loading and unloading station for said cylinder head and a station for loading said guides and seats in an upper and lower mask, respectively (the term mask refers to any type of support that allows housing a series of guides or seats until their placement in the cylinder head);
  a second pressing station for the assembly and pressing of said guides and seats in the cylinder head;
  a rotating table comprising a first support tool and a second support tool (preferably, the first and second tools are alike), being said first and second tools configured to support a cylinder head, and the aforementioned table being configured to rotate so that the first tool and the second tool are arranged alternatively and simultaneously at the first station and at the second station (this means to say that the first support tool will be arranged at the first station for the loading of the cylinder head and the seats and guides in the corresponding masks and will then pass on to the second station for the assembly of the guides and seats, and simultaneously, the second support tool will be arranged at the second station and will then pass on to the first station);
  a first manipulator, configured to place said guides and seats in the upper and lower masks, respectively, at the first station;
  at least one pressing head, configured to snap the seats and guides on to the cylinder head at the second station.

The operation of the machine of the invention will be the following: a support tool (for example, the first tool) is positioned at the first station with a loaded cylinder head and the upper and lower masks. The other support tool (for example, the second tool) is therefore located at the second pressing station. The first manipulator places the guides in the upper mask and the seats in the lower mask. The assembly and pressing of the other cylinder head is carried out simultaneously at the second station, thus increasing the machine's productivity. Next, the rotating table rotates to position the support tool (for example, the first tool) at the second station. At this station, the pressing head (even though there might be more than one pressing head to increase productivity) snaps the guides and seats on to the cylinder head. It is possible to unload another cylinder at the first station, which has been assembled previously at the second station, simultaneously with the loading of a new cylinder head, guides and seats at the first station. Next, the rotating table rotates so that the support tool (for example, the first tool), remains at the first station for unloading the cylinder head with the assembled guides and seats. Obviously, when there are operations being carried out simultaneously at the two stations, the rotation of the rotating table is carried out when the operation requiring the most time is completed, whether it involves the first station or the second station. This way, it is possible to increase productivity because instead of being the machine's time cycle the sum of the time taken by the loading cycle plus the pressing cycle, it is reduced to only the longest time required for one those processes.

Preferably, the first and second tools are arranged at 180° on the rotating table, so that the first and second stations are facing each other, thus optimizing the size of the machine.

In order to carry out the operations of the first and second stations simultaneously, the possibility that the machine can comprise two upper masks and two lower masks is envisaged.

The lower mask can be affixed to the rotating table and comprises at least one line of seat housings (for example, two lines corresponding to admission and escape valves respectively, according to cylinder head type, for example, with in-line and inclined valves), configured to house valve seats, being said valve seats arranged in a vertical position. These housings can be activated independently by the assembly or insertion unit or units, and may comprise automatic return means to return to the at-rest position.

The upper mask is assembled over the first or second tool in an extractable manner (during each cycle) in order to allow loading and unloading the cylinder head. Said upper mask comprises at least one line of guide housings, configured to house the valve guides. The aforementioned valve guide housings exhibit an angle regarding the vertical axis depending on cylinder head type. The mask may comprise means to determine the guides' insertion height.

The first and second tool may have tilting means that allow tilting a cylinder head so that the valves' axes remain in a vertical position to allow placing the guides and seats in a vertical position, so that the pressing head can always operate vertically, regardless of the angle of the valves in the cylinder head. The first manipulator can be a manipulating robot (preferably a SCARA robot with one or two clamps) arranged on the rotating axis of the rotating table to optimize its task (preventing interferences) and to reduce the dimensions of the machine.

According to the present invention, said second pressing station comprises a pressing head that snaps said guides and seats on to the engine cylinder head. Said second pressing station may comprise two pressing heads to reduce the cycle time and to increase productivity. When working simultaneously with two pressing heads, the heads may be assembled at a fixed distance or on cars driven by means of a servo-controlled axis to regulate the separation between them.

The aforementioned pressing head can comprise displacement means in two perpendicular directions (for example, in the directions X and Y according to a plane parallel to the ground) to allow the positioning of the head in the different positions of the guides and seats. For this purpose, the head or heads may be assembled on a table displaceable with a Cartesian movement in order to move the pressing head to the different assembly or insertion positions (each one of the admission and escape valves), while also correcting the misalignment between the admission and escape originated by the rotation of the cylinder head to position the valves' axes vertically.

The aforementioned pressing head can comprise an electric press assembled over a C-shaped structure to withstand the reaction forces during the insertion of the guides and seats. Said C-shaped structure is displaceable vertically regarding said rotating table. The structure is guided vertically and balanced in weight to reduce the influence that the weight itself could exercise on the insertion forces and to speed up the process.

The structure comprises braking and blocking means for the vertical displacement of the C-shaped structure during the different phases of the pressing process.

The pressing head can comprise a lower pusher for the pressing of the seats and an upper pusher for the pressing of the guides. Likewise, it may comprise a top blocking retractile element, which withstands the reaction force during the pressing of the seats.

An assembly cell is also object of the invention, which, in addition to the machine of the invention, can comprise the following:

A second manipulator that places and removes a cylinder head at/from said first loading and unloading station. This loading takes place over an empty support tool (which may be the first or second tool) after unloading the last cylinder head with the assembled seats and guides, for example. Said second manipulator also loads and unloads the upper mask at the first station.

An oiling unit. In this case, said second manipulator places said cylinder head at the oiling station before placing it at the first loading and unloading station;

A cylinder head infeed and outfeed conveyor;

An inspection conveyor for out of tolerance cylinder heads.

A greater productivity is achieved with the engine valve guide and seat assembly cell of the present invention than with current cells.

BRIEF DESCRIPTION OF THE DRAWINGS

Next, in order to supplement the description and with the purpose of achieving a better comprehension of the characteristics of the invention according to a preferred practical embodiment of the same, a set of figures are joined to this description, as an integral part thereof by way of illustration and not by way of limitation, in which the following is represented.

PREFERRED EMBODIMENT OF THE INVENTION

Figure 1:
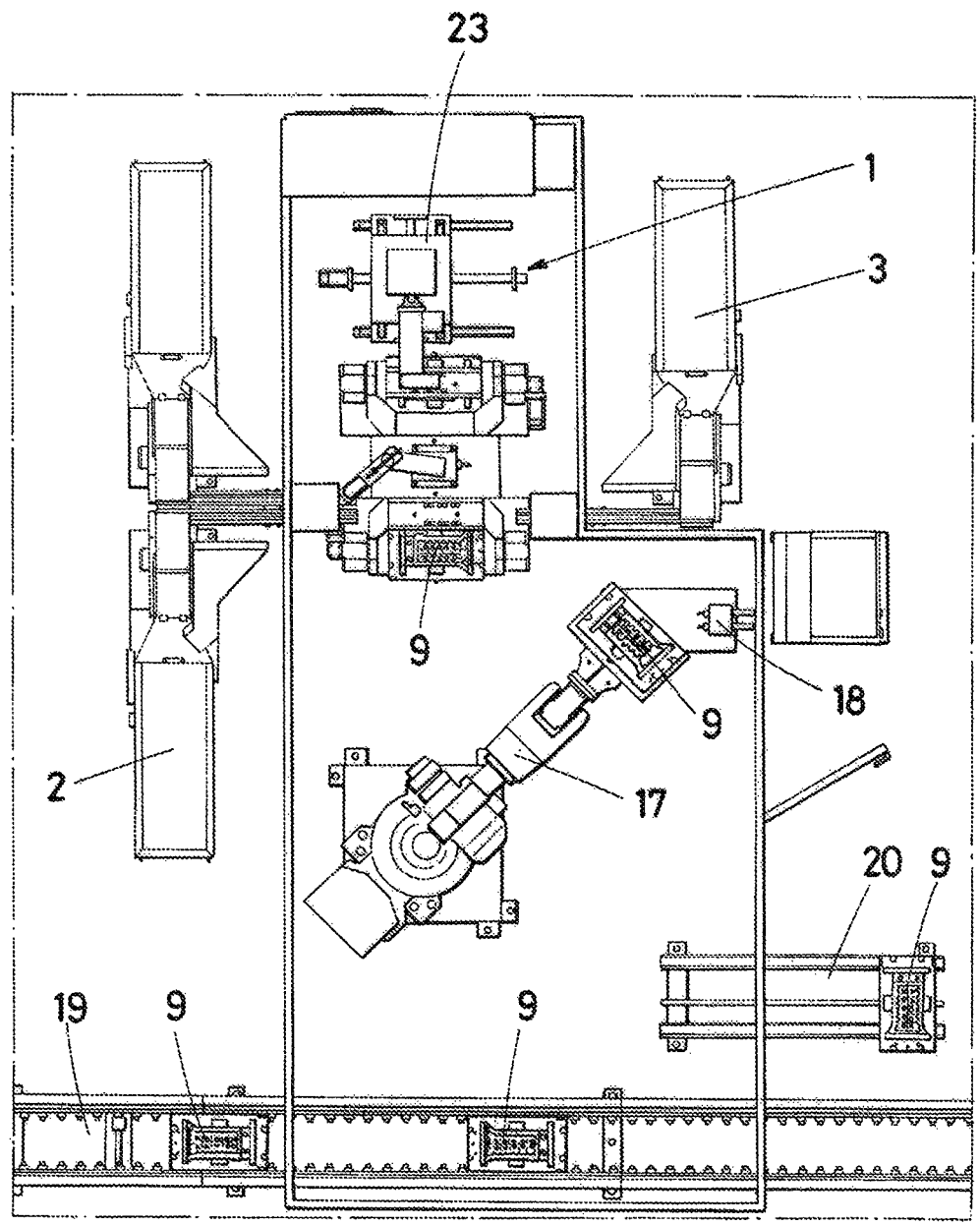
FIG. 1 is a plan view of the assembly cell of the present invention.

FIG. 1 shows a schematic view of the components of the assembly cell of the present invention.

The assembly cell comprises the following:

an assembly machine, generally identified by means of the numeric reference 1, which, in turn, comprises a first station 4 for loading and unloading engine cylinder heads 9 and a second pressing station 5, at which the valve seats 12 and guides 13 are snapped on to said engine cylinder heads 9;

a seat feeder 2, supplying the seats 12 to said first station 4;

a guide feeder 3, supplying the guides 13 to said first station 4;

a engine cylinder head 9 infeed/outfeed conveyor 19, providing the cylinder heads 9 to the assembly machine 1 and evacuating the cylinder heads 9 once the guides 3 and the seats 2 are assembled. A second manipulating robot 17 is in charge of loading the cylinder heads 9 from the infeed/outfeed conveyor 19 to the assembly machine 1 and of the unloading from the assembly machine 1 to the infeed/outfeed conveyor 19;

an oiling station 18 in which the cylinder head 9 is oiled before being placed in the assembly machine 1; and an inspection conveyor belt 20, by means of which the out of tolerance cylinder heads 9 are removed.

Figure 2:
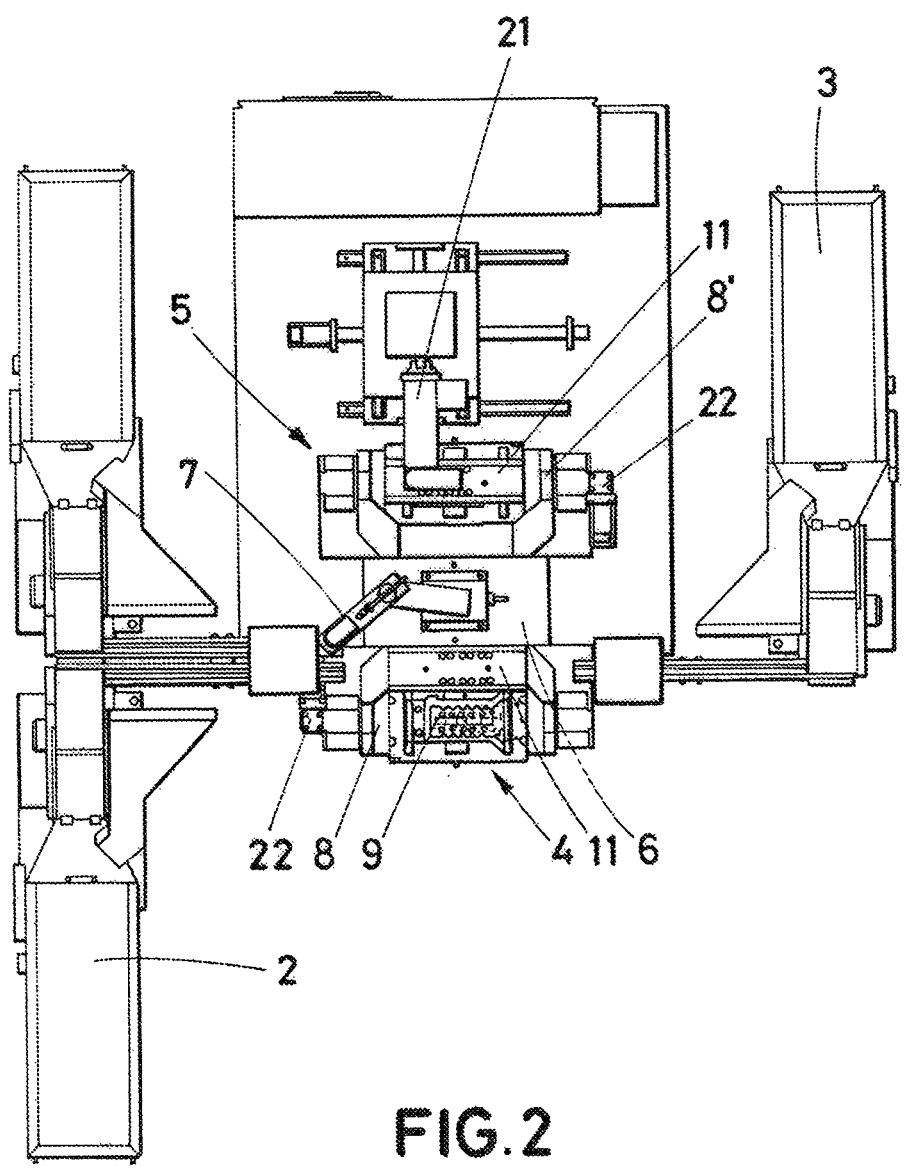
FIG. 2 is a plan view of the assembly machine of the present invention.
Figure 3:
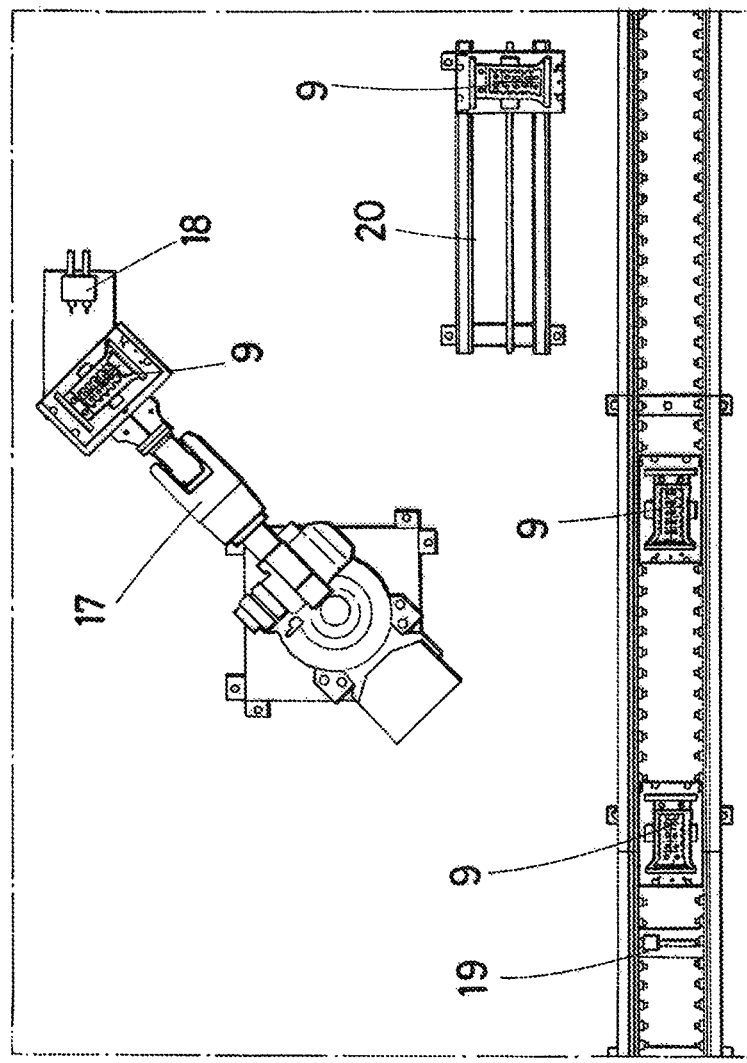
FIG. 3 is a plan view of the peripherals of the assembly cell of the present invention.

In FIG. 2, the components of the assembly machine 1 can be observed in more detail, which comprises a rotating table 6 on which a first support tool 8 and a second support tool 8' are assembled, so that the tools 8 and 8' can rotate 180° regarding a vertical rotating axis arranged at the center of the rotating table 6.

Figure 4:
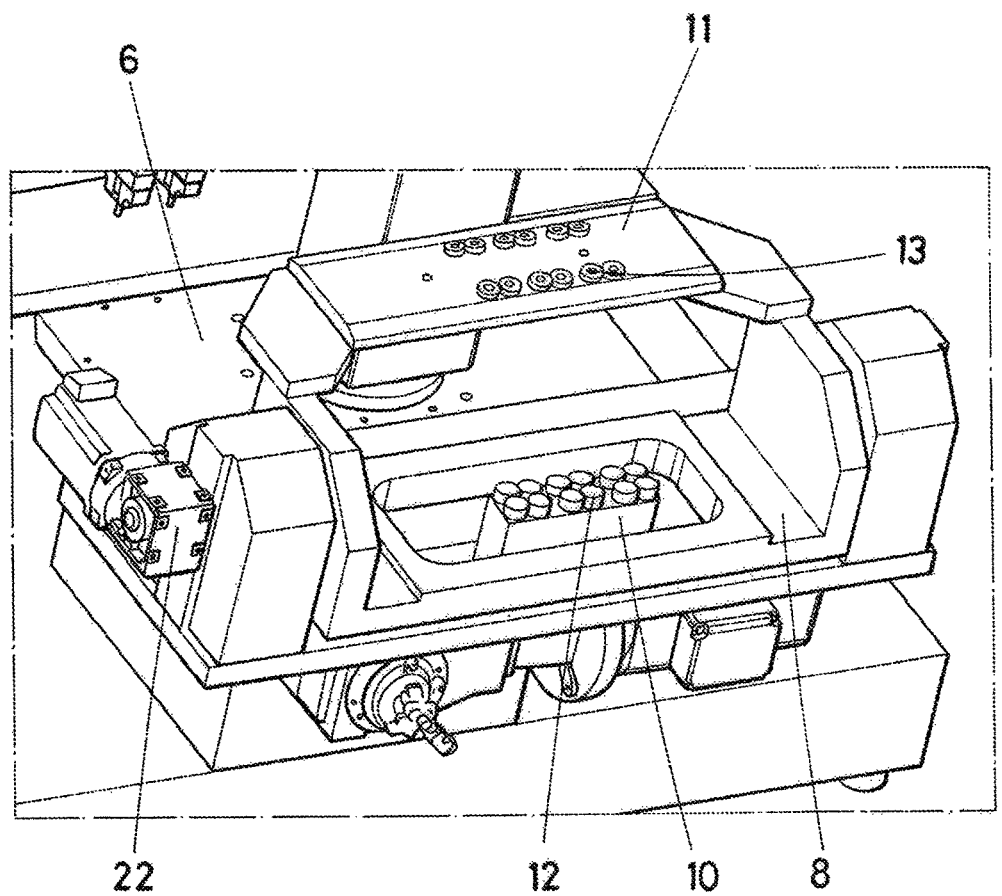
FIGS. 4 to 7 are perspective views of a part of the assembly machine in which the placing and pressing steps of the guides and seats in the engine cylinder head can be observed.
Figure 5:
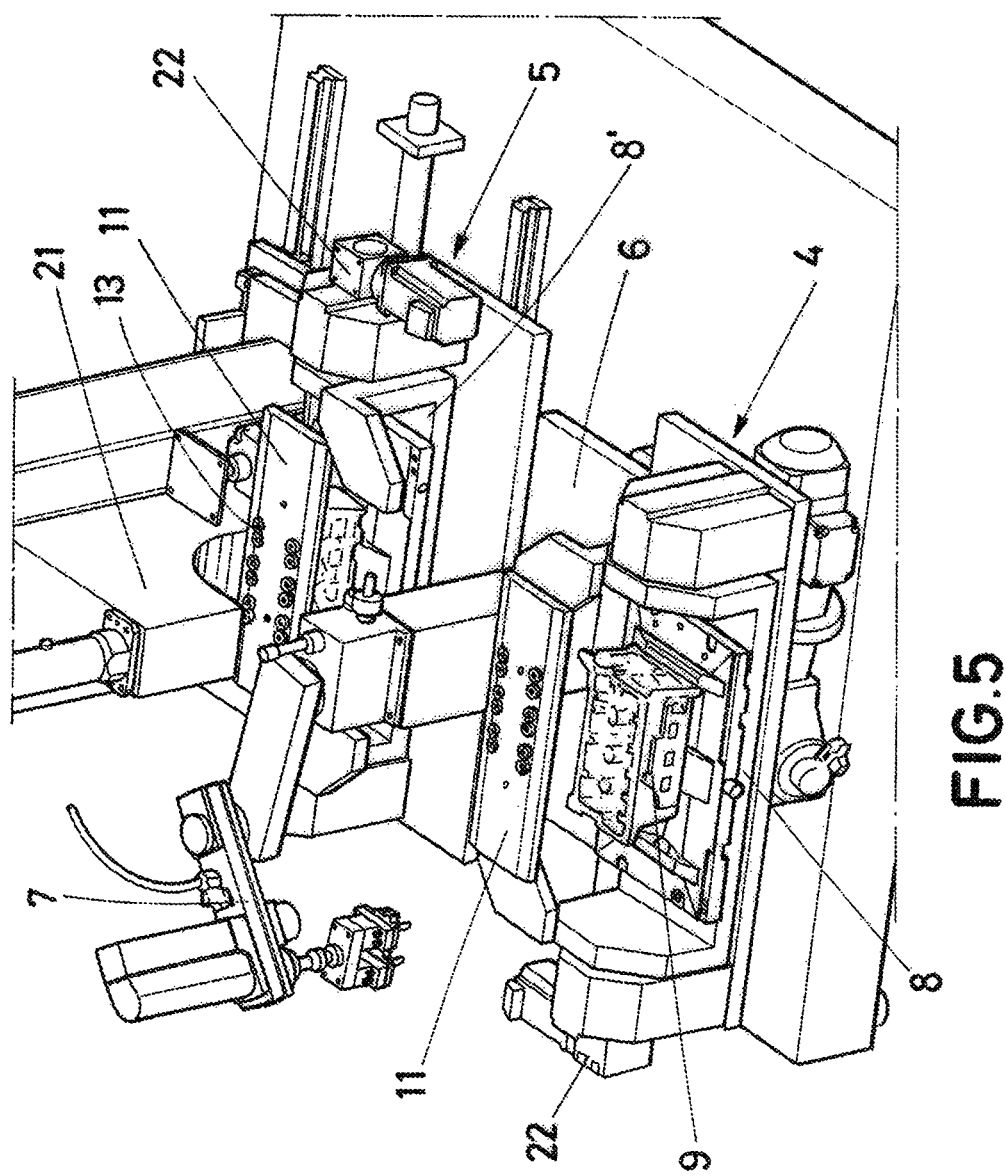
Figure 6:
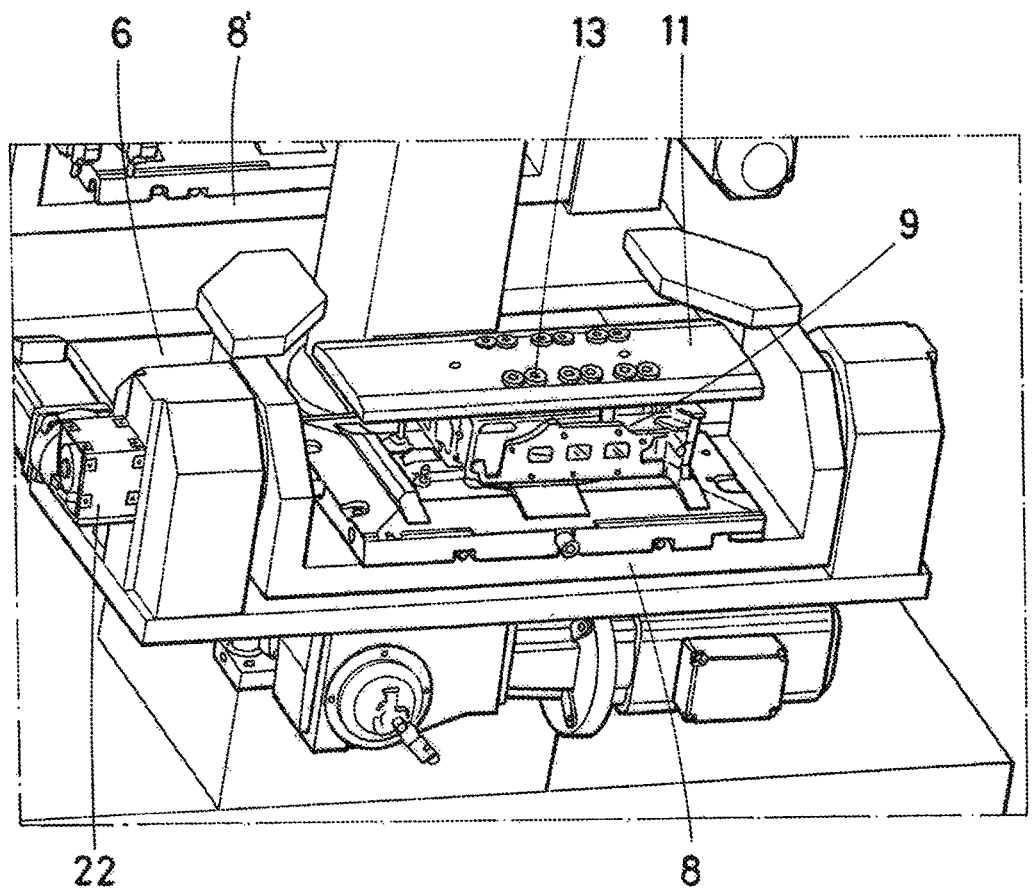
Figure 7:
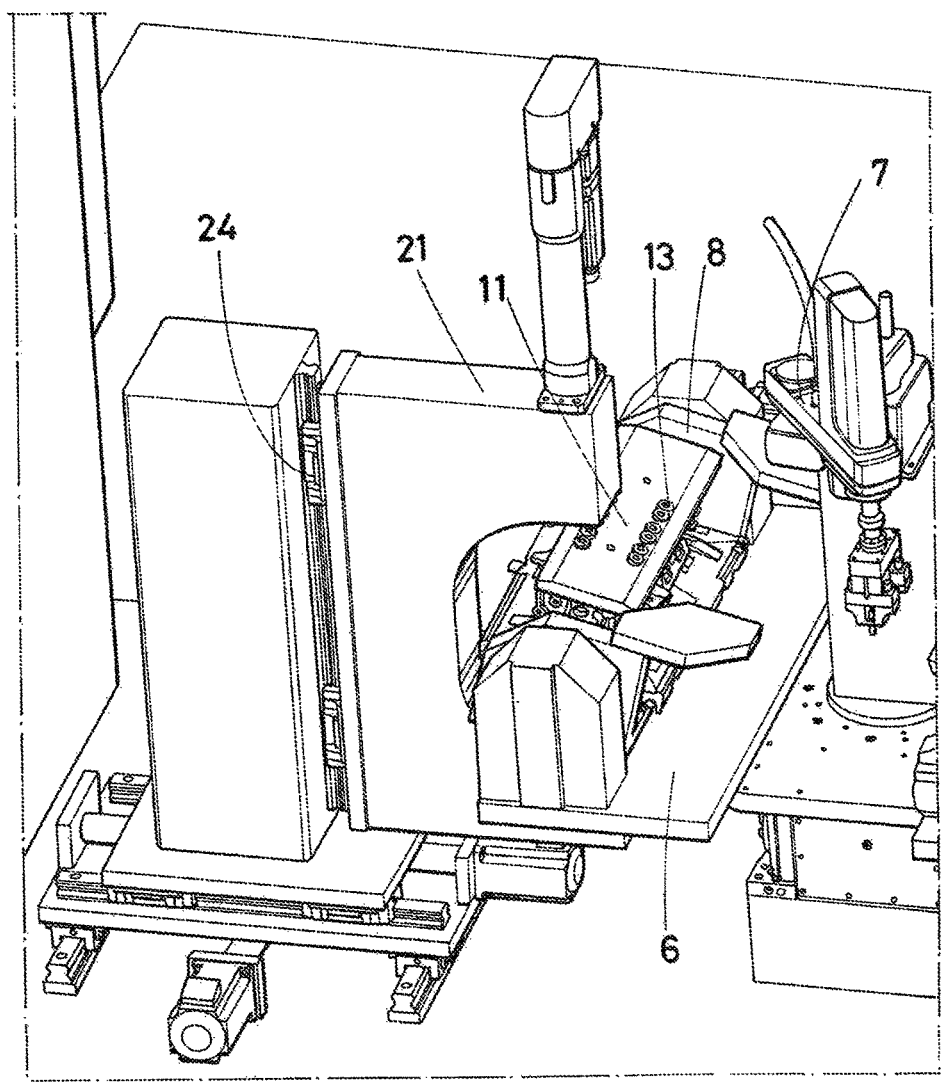

The first tool 8 and the second tool 8' have tilting means 22 (for example, an engine) for tilting the cylinder head; a lower mask 10 to place the seats 12, arranged under the tool 8, 8' and affixed to the rotating table 6, so that the cylinder head 9 is located above the lower mask 10, as observed in FIG. 4; and an upper mask 11 for the guides 13, which is located above the cylinder head 9.

The guides 13 are loaded in the upper mask 11, which is extractable at each cycle to load and unload the cylinder head 9. The upper mask 11 will arrange the housings for the guides 13 according to the geometry of the engine cylinder head 9 (position and angle) and will include tools to determine the precision in the insertion height of said guides.

The valve seats 12 will be loaded at the lower mask 10, which will be provided with one or two housing lines (admission and escape), depending on the type of cylinder head 9 (in-line or inclined valves). These housings will be arranged in a vertical position and will be activated independently by insertion unit (or units) and will have an independent return to an at-rest position.

The assembly machine 1 also comprises a first manipulating robot 7, arranged according to the rotating axis of the rotating table 6, whose purpose is to place the seats 12 and the guides 13 at the lower mask 10 and the upper mask 11, respectively.

The feeding of the first station 4 (seats 12, guides 13, cylinder head 9 and the upper mask 11) can be manual or automatic. The automatic feeding means were represented in the attached figures.

Option 1: Manual feeding

The operator will carry out the following functions:
Loading seats 12 and guides 13 to the lower mask 10 and upper mask 11;
Loading/unloading the engine cylinder head 9;
Loading/unloading the upper mask 11.

Option 2: Automating feeding

The following functions are carried out:
Feeding of guides 13: automatically, by means of one or several vibrators, depending on the amount to be assembled or on the time required to change batches;
Feeding seats 12: automatically and according to two main options: a) by means of vertical housings arranged circularly or in line; b) by means of staggered feeders.
Loading/unloading the cylinder head 9: by means of a second manipulating robot 17 (six-axis) arranged at the cell and outside of the assembly machine 1;
Loading/unloading the upper mask 11: carried out by the same manipulating robot manipulating the cylinder head 9.

The feeding of these components (guides 13 and seats 12) will be carried out at the same assembly height, so that no blowing or transportation system by means of flexible conduits is required. With the solution presented, there are savings in air consumption and in the maintenance of feeder tubes.

Prior to loading seats 12 and guides 13 to the masks 10 and 11, the recognition of type and position must be carried out. The type of solution adopted will depend on the amount of components to be controlled, with the option of choosing a mechanical, laser or vision measuring device.

The second station 5 comprises a pressing head 21 that snaps the seats 12 and guides 13 on to the cylinder head 9. For this purpose a pusher 14 for the seats 12 and pusher 15 for the guides 13 is used. Said pressing head 21 also comprises a mechanical blocking element 16 to withstand the insertion force of seats 12.

The pressing head (or heads) 21 is assembled on a table 23 with a horizontal

Cartesian movement in two axes XY to displace the pressing head 21 to the different insertion positions (each one of the admission and escape valves), while also correcting the misalignment between the admission and escape originated during the rotation of the cylinder head 9 to position the axes of the vertically-arranged valves.

The pressing head 21 is based on an electric press, which will be integrated into a C-shaped structure that will withstand the contrary reaction of the insertion forces. The structure will be guided vertically 24 and balanced in weight to reduce the influence that the weight itself could exert on the resulting insertion forces, while speeding up the process.

The insertion of the components (seats 12 and guides 13) is carried out with a single press, but by controlling the force and insertion height of the seats 12 and guides 13 independently. For this purpose, the pressing head 21 is provided with a mechanical blocking element 16 to liberate/activate the support, for pressing the seat 12, or to liberate/activate the guides 13 pusher 15. The C-shaped structure is also provided with an external lock to immobilize the structure during the process of liberating/activating the support/pusher.

Figure 8:
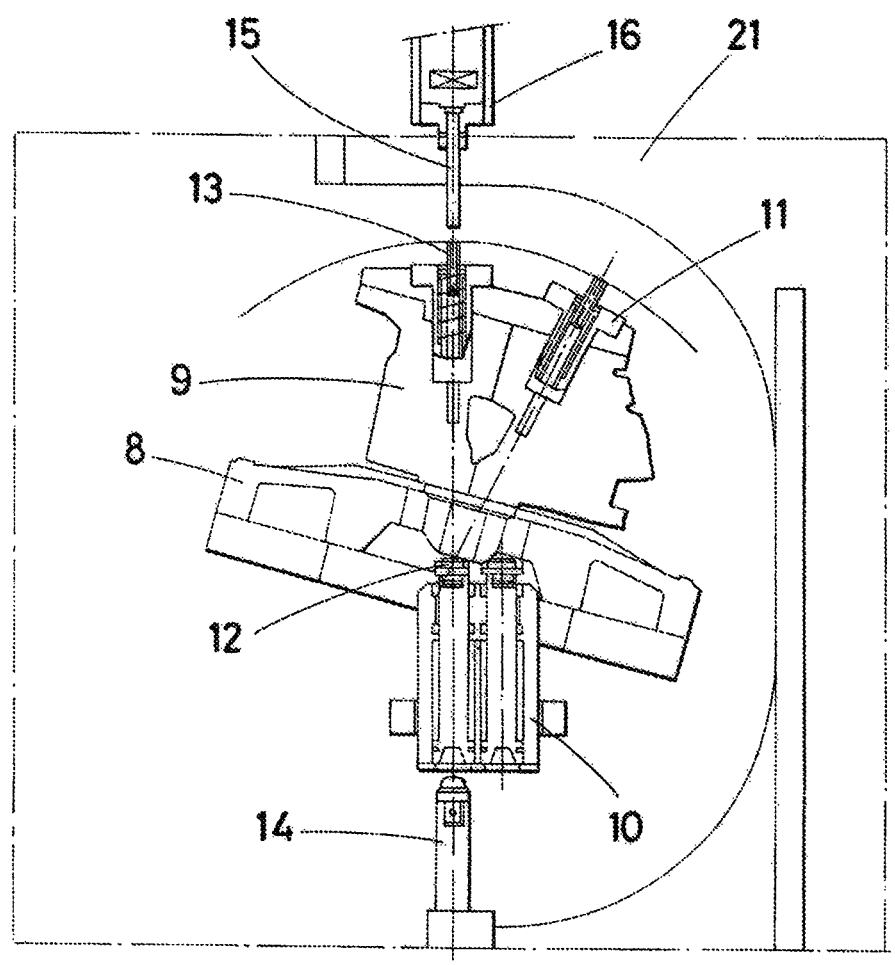
FIGS. 8 to 13 are elevation views of the pressing steps with the pressing head of the invention, in which the manner in which the guides and seats are placed in the engine cylinder head can be observed.
Figure 9:
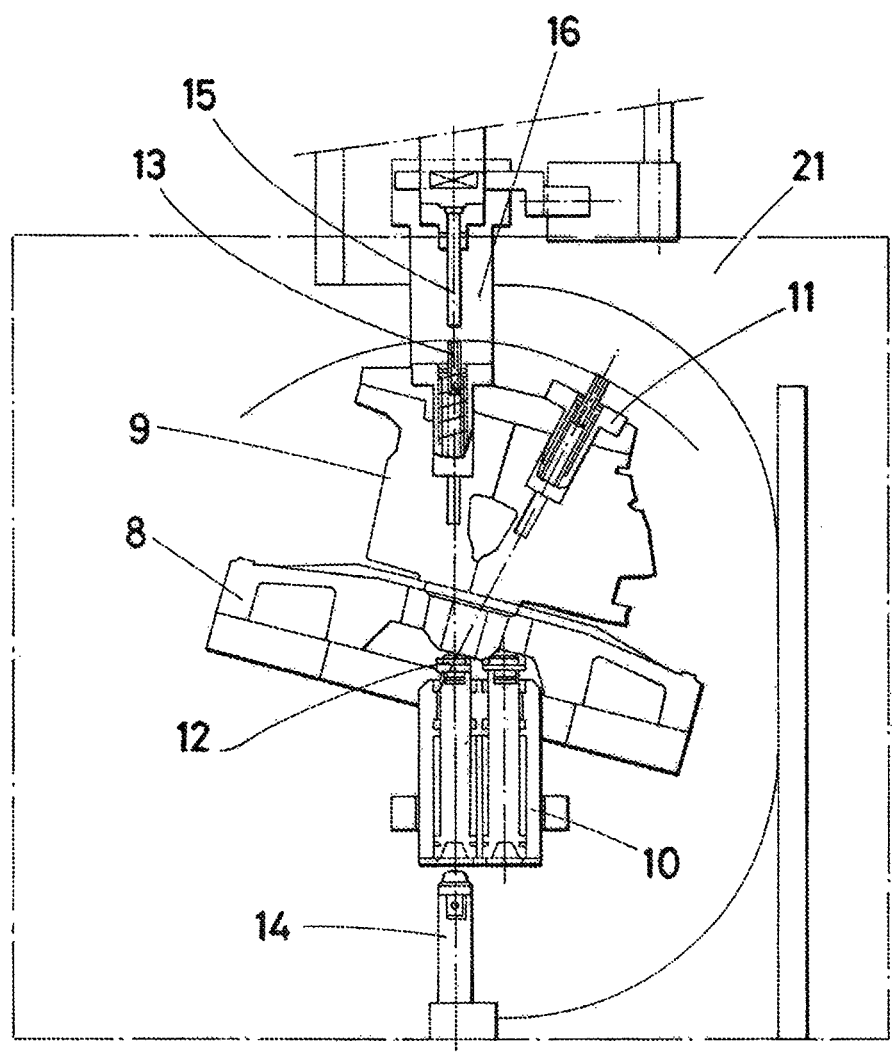
Figure 10:
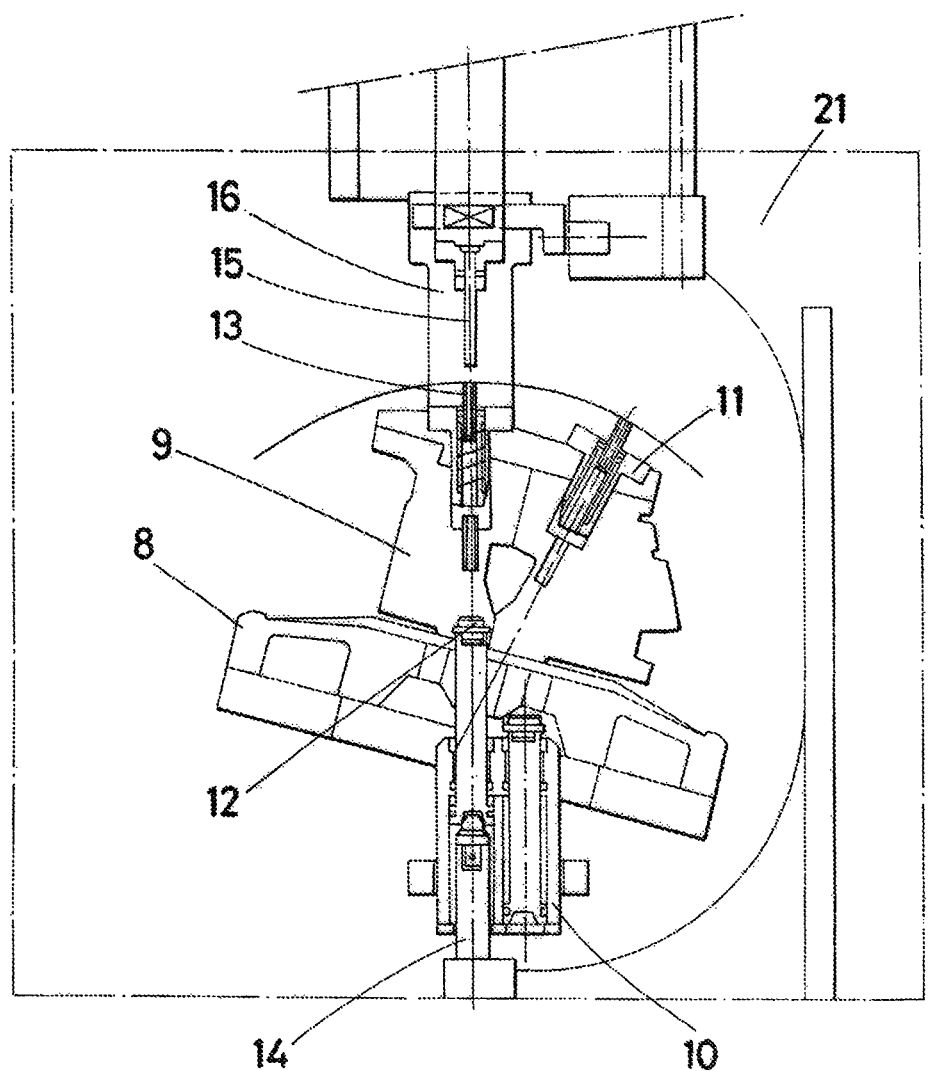

The operating steps of the pressing head 21 would be the following:

A—Introduction of the Seats a1. The C-shaped structure is placed in the corresponding position regarding the cylinder head 9 (this position is observed in FIG. 8);

a2. The upper blocking element 16 descends until entering into contact with the upper mask 11. This blocking element 16 withstands the pushing force during the insertion of the seats 12 (this position is observed in FIG. 9);

a3. The C-shaped structure moves vertically (upwards) so that the lower pusher 14 introduces a seat 12 in its corresponding housing of the cylinder head. The blocking element 16 withstands the insertion force during this operation. The external lock of the C-shaped structure is activated in this position (this position is observed in FIG. 10).

Figure 11:
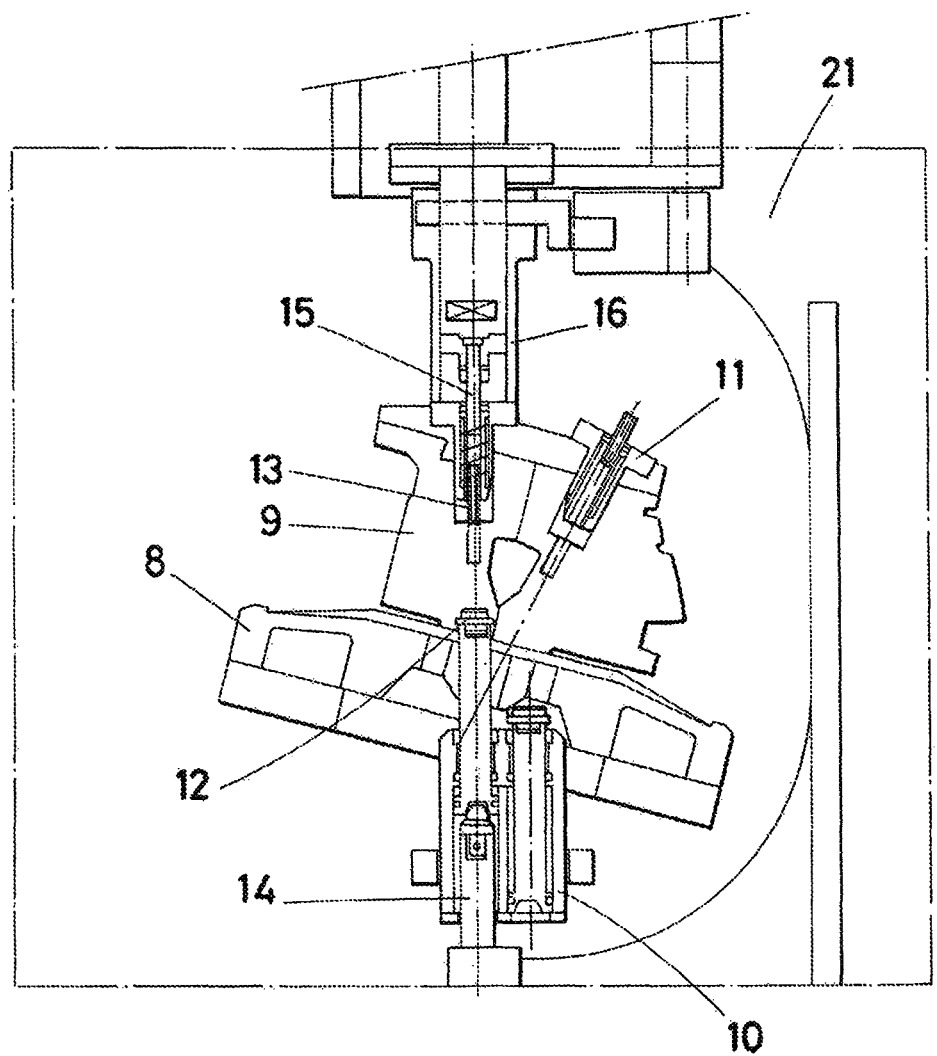
Figure 12:
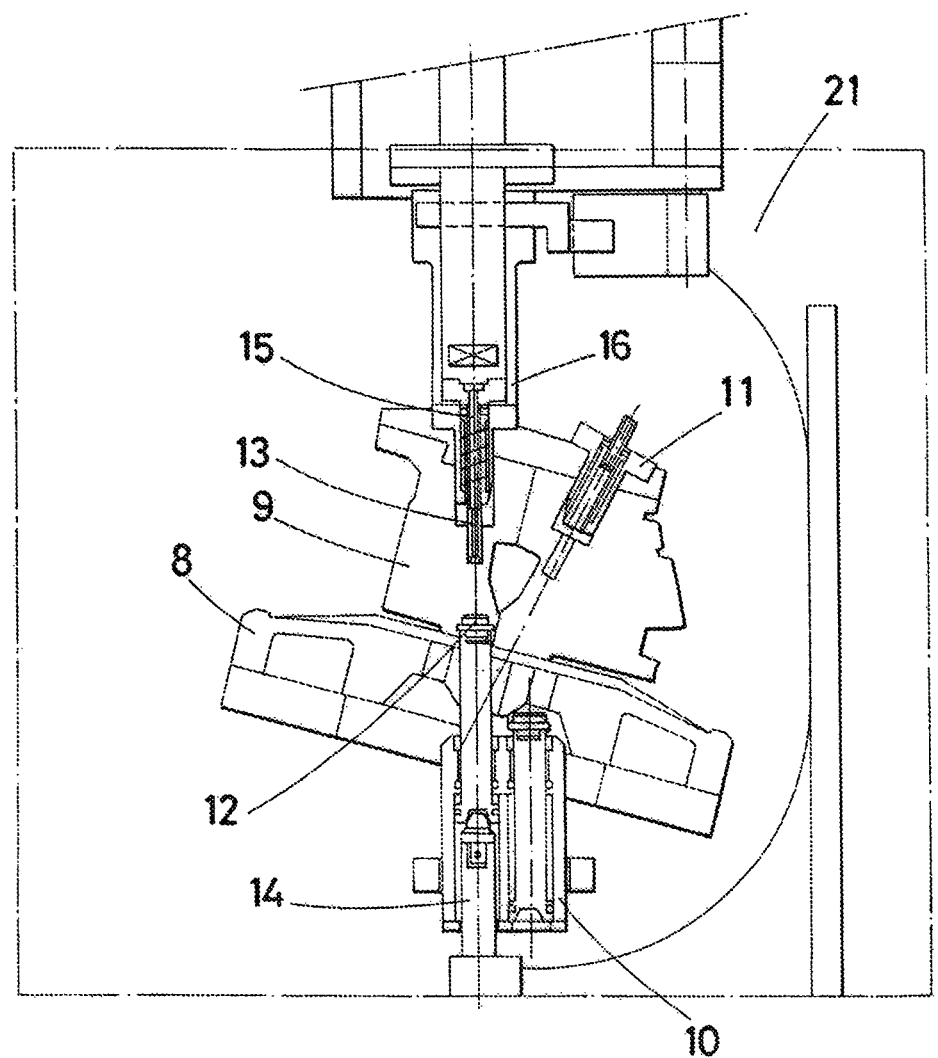
Figure 13:
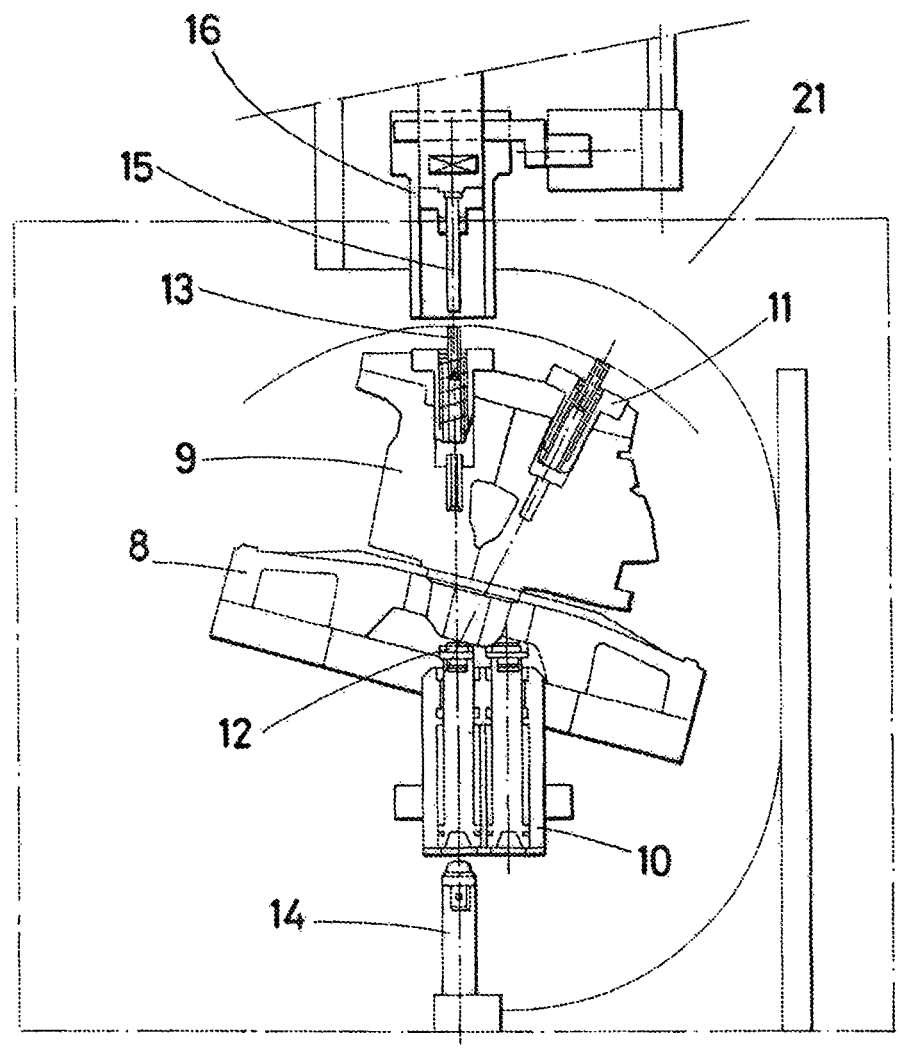

B—Introduction of the Guides b1. The upper pusher 15 descends, beginning the introduction of one guide 13 into the corresponding housing of the cylinder head 9 (this position is observed in FIG. 11);

b. The insertion of the guide 13 is completed, pushing against the seat in the housing of the cylinder head 9 and unlocking the external lock of the C-shaped structure (this position is observed in FIG. 12);

c. The C-shaped structure begins its descent liberating the upper pusher 15 (this position is observed in FIG. 13).

The model changes are carried out simply through the mechanical change of the pusher 15 of the guides 13, in addition to the necessary programming.

In this text, the word "comprises" and its variants (such as "comprising", etc.), should not be interpreted in an excluding manner, that is to say, they do not exclude the possibility that what is being described includes other elements, steps, etc.

On the other hand, the invention is not limited to the specific embodiments that have been described; it also includes, for example, the variants that could be carried out by anyone with an ordinary skill in the art (for example, regarding the choice of materials, dimensions, components, configuration, etc.) within the scope of the claims.

The invention claimed is:

1. Machine for the assembly of valve guides and seats in a cylinder head comprising: a first station for loading and unloading said head and for loading said guides and said seats at least one upper mask and at least one lower mask, respectively; a second pressing station for the assembly and pressing of said guides and said seats in the cylinder head; a rotating table comprising a first support tool and second support tool, the first and second tools configured to support the cylinder head and being said table configured to rotate so that the first tool and the second tool are arranged alternatively and simultaneously at the first station and the second station; a first manipulator configured to place said guides and said seats in the at least one upper mask and lower mask respectively at the first station; and at least one pressing head configured to snap the seats and the guides on to the cylinder head at the second station.

2. The machine for the assembly of valve guides and seats in the cylinder head, according to claim 1, in which the first tool and the second tool are arranged at 180° on the rotating table.

3. The machine for the assembly of valve guides and seats in the cylinder head according to claim 1, wherein the at least one upper and lower mask comprises two upper masks and two lower masks.

4. The machine for the assembly of valve guides and seats in the cylinder head according to claim 1, in which the first tool and the second tool have tilting means allowing tilting the cylinder head so axes of the valves remain in a vertical position for the placement of the guides and seats in a vertical position.

5. The machine for the assembly of valve guides and seats in the cylinder head according to claim 1, in which the at least one lower mask is affixed to the rotating table and comprises at least one line of seat housings configured to house the valve seats, said housings arranged in a vertical position.

6. The machine for the assembly of valve guides and seats in the cylinder head according to claim 1, wherein the at least one upper mask is assembled on the first tool or the second tool in an extractable manner to allow loading and unloading of the cylinder head, and the at least one upper mask comprises at least one line of guide housings configured to house the valve guides.

7. The machine for the assembly of valve guides and seats in the cylinder head according to claim 1, wherein the first manipulator is a manipulating robot arranged on a rotating axis of the rotating table.

8. The machine for the assembly of valve guides and seats in the cylinder head according to claim 1, wherein at least one pressing head comprises an electric press assembled over a C-shaped structure to withstand reaction forces during the insertion of the guides and the seats, the C-shaped structure vertically displaceable relative to said rotating table.

9. The machine for the assembly of valve guides and seats in the cylinder head according to claim 1, wherein the at least one pressing head, comprises displacement means in two perpendicular directions to allow positioning the cylinder head in different positions in the guides and the seats.

10. The machine for the assembly of valve guides and seats in the cylinder head according to claims 9, further comprising braking and blocking means for vertical displacement of the C-shaped structure.

11. The machine for the assembly of valve guides and seats in the cylinder head according to claim 1, wherein the at least one pressing head comprises a lower pusher for pressing the seats and an upper pusher for pressing the guides.

12. The machine for the assembly of valve guides and seats in the cylinder head according to claim 8, wherein said pressing head comprises a top blocking retractile element.

13. The machine for the assembly of valve guides and seats in the cylinder head according to claim 1, further comprising a second manipulator that places the cylinder head in said first loading and unloading station and removes the cylinder head from said first loading and unloading station, and loads and unloads the at least one upper mask at the loading station.

14. The machine for the assembly of valve guides and seats in the cylinder head according to claim 13, comprising an oiling unit and wherein said second manipulator places said cylinder head at the oiling station prior to the placement of the cylinder head in said first loading and unloading station.

15. The machine for the assembly of valve guides and seats in the cylinder head according to claim 13 or 14, further comprising a cylinder head infeed and outfeed conveyor and an inspection conveyor for out of tolerance cylinder heads.

* * * * *